(12) United States Patent
Gaal et al.

(10) Patent No.: US 9,941,998 B2
(45) Date of Patent: Apr. 10, 2018

(54) CONTROL INFORMATION SIGNALING FOR MIMO TRANSMISSIONS

(75) Inventors: Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1868 days.

(21) Appl. No.: 13/167,383

(22) Filed: Jun. 23, 2011

(65) Prior Publication Data

US 2011/0317643 A1    Dec. 29, 2011

Related U.S. Application Data

(60) Provisional application No. 61/358,333, filed on Jun. 24, 2010.

(51) Int. Cl.
*H04L 1/00* (2006.01)
*H04L 5/00* (2006.01)

(52) U.S. Cl.
CPC .......... *H04L 1/0029* (2013.01); *H04L 1/0031* (2013.01); *H04L 5/0023* (2013.01); *H04L 5/0053* (2013.01); *H04L 5/0055* (2013.01); *H04L 1/0003* (2013.01); *H04L 1/0009* (2013.01)

(58) Field of Classification Search
CPC ... H04L 1/0029; H04L 1/0031; H04L 1/0003; H04L 5/0023; H04L 5/0055; H04L 5/0053
USPC .......................................................... 370/329
See application file for complete search history.

(56) References Cited

U.S. PATENT DOCUMENTS

| | | | | |
|---|---|---|---|---|
| 8,245,092 B2 * | 8/2012 | Kotecha et al. | ............... | 714/748 |
| 8,386,875 B2 * | 2/2013 | Earnshaw et al. | ............ | 714/751 |
| 2010/0135181 A1 | 6/2010 | Earnshaw et al. | | |
| 2010/0142455 A1 | 6/2010 | Imamura | | |
| 2010/0323709 A1 * | 12/2010 | Nam et al. | .................... | 455/450 |
| 2011/0013615 A1 * | 1/2011 | Lee et al. | ...................... | 370/344 |
| 2011/0064159 A1 * | 3/2011 | Ko et al. | ........................ | 375/267 |
| 2011/0103324 A1 | 5/2011 | Nam et al. | | |

(Continued)

FOREIGN PATENT DOCUMENTS

| | | |
|---|---|---|
| CN | 101695017 A | 4/2010 |
| CN | 101699780 A | 4/2010 |
| EP | 2086153 A2 | 8/2009 |

OTHER PUBLICATIONS

QUALCOMM Incorporated, "UL grants for MIMO transmissions" 3GPP TSG-RAN WG1 #61bis, R1-103549, Jun. 28-Jul. 2, 2010, Dresden, Germany, pp. 1-6.

(Continued)

*Primary Examiner* — Asad Nawaz
*Assistant Examiner* — Saad A Waqas
(74) *Attorney, Agent, or Firm* — Patterson & Sheridan, L.L.P.

(57) ABSTRACT

Certain aspects of the present disclosure provide techniques for conveying downlink control information (DCI). According to certain aspects, the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled.

40 Claims, 8 Drawing Sheets

(56) References Cited

U.S. PATENT DOCUMENTS

2011/0110455 A1 5/2011 Gaal et al.
2011/0170498 A1* 7/2011 Liu et al. ..................... 370/329

OTHER PUBLICATIONS

QUALCOMM Incorporated, "UL Transmission Modes and Grants for MIMO Transmissions," 3GPP TSG-RAN WG1 #61, May 10-14, 2010, Montreal, Canada, pp. 1-5.
QUALCOMM Incorporated, "UL Transmission Modes for MIMO Transmissions," 3GPP TSG-RAN WG1 #61, Jun. 28-Jul. 2, 2010, Dresden, Germany, pp. 1-5.
PCT Search Report and Written Opinion for PCT/US2011/041807, dated Sep. 15, 2011.

* cited by examiner

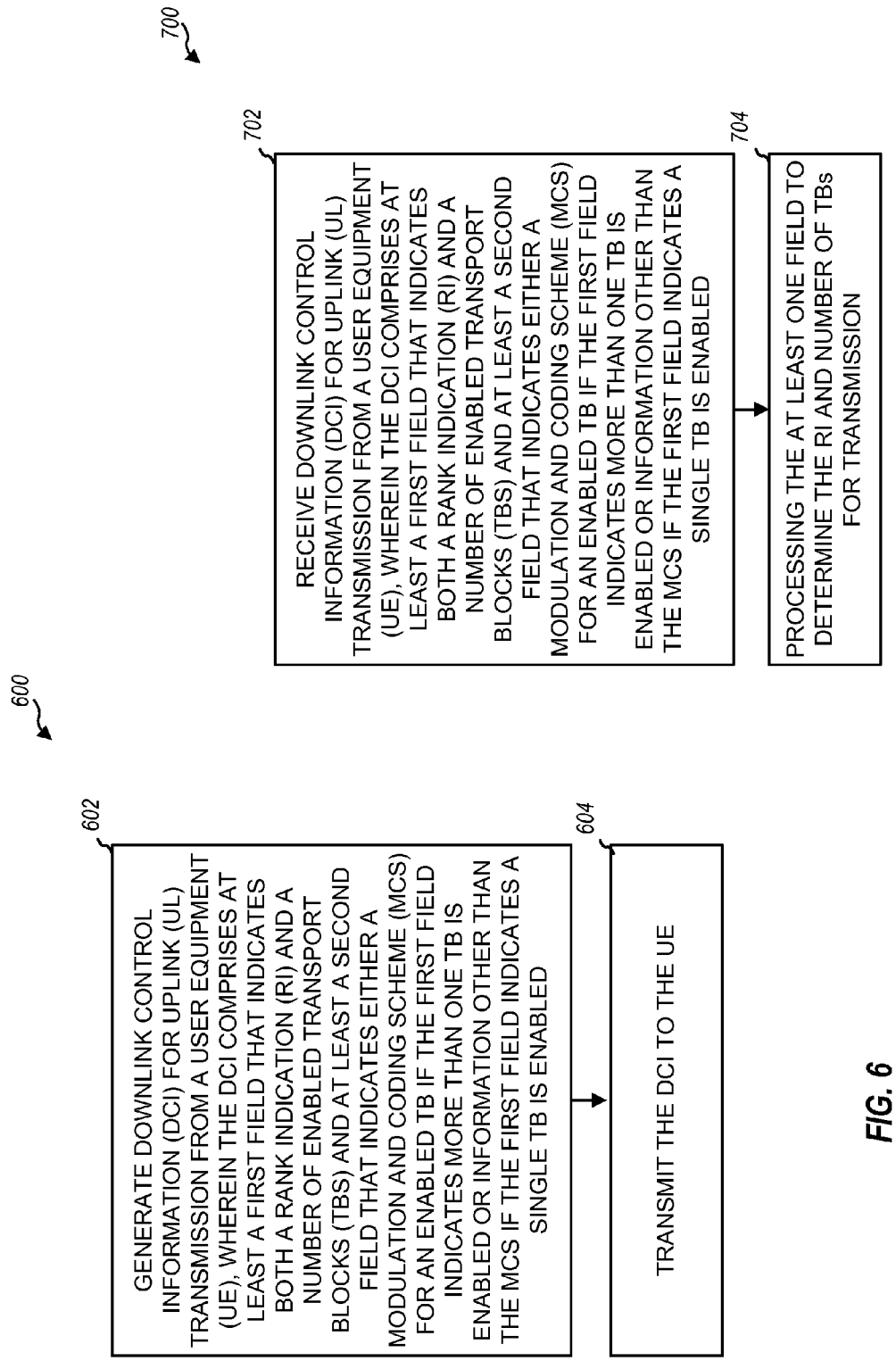

| Field | Bit-width | Notes |
|---|---|---|
| Resource block assignment | FFS | FFS |
| MCS and RV – 1st TB | 5 | Same definition as in DCI format 0 for one TB |
| NDI – 1st TB | 1 | Same as Rel-8 |
| MCS and – 2nd TB | 5 | For two enabled TBs, same definition as in DCI format 0 for the second TB; otherwise, indicating PMI/RI information |
| NDI – 2nd TB | 1 | For two enabled TBs, same as Rel-8; otherwise, indicating which TB is enabled |
| PMI/RI | 1 or 5 | 1 bit if 2 Tx indicating RI, and 5 bits if 4 Tx indicating PMI/RI and/or # of enabled TB |
| TPC | 2 | Same as Rel-8 |
| Cyclic shift for DM RS | 3 | Same as Rel-8, CS for other than antenna port 0 is implicit [3] |
| UL index (TDD only) | 2 | Same as Rel-8 |
| Aperiodic CQI request | 1 or FFS | FFS on how to support multi-carrier operation |
| Aperiodic SRS request | FFS | FFS |

*FIG. 8*

| Field | Bit-width | Notes |
|---|---|---|
| Resource block assignment | FFS | FFS |
| MCS and RV – 1st TB | 5 | Same definition as in DCI format 0 for one TB |
| NDI – 1st TB | 1 | Same as Rel-8 |
| MCS and – 2nd TB | 5 | For two enabled TBs, same definition as in DCI format 0 for the second TB; otherwise, indicating PMI/RI information |
| NDI – 2nd TB | 1 | For two enabled TBs, same as Rel-8; otherwise, indicating which TB is enabled |
| PMI/RI | 1 or 2 | 1 bit if 2 Tx indicating RI, and 2 bits if 4 Tx indicating RI and # of enabled TB |
| TPC | 2 | Same as Rel-8 |
| Cyclic shift for DM RS | 3 | Same as Rel-8, CS for other than antenna port 0 is implicit [3] |
| UL index (TDD only) | 2 | Same as Rel-8 |
| Aperiodic CQI request | 1 or FFS | FFS on how to support multi-carrier operation |
| Aperiodic SRS request | FFS | FFS |

*FIG. 9*

CONTROL INFORMATION SIGNALING FOR MIMO TRANSMISSIONS

CROSS-REFERENCE TO RELATED APPLICATIONS

This application claims priority to U.S. Provisional Application Ser. No. 61/358,333, filed on Jun. 24, 2010, which is expressly incorporated by reference herein in its entirety.

BACKGROUND

I. Field

Certain aspects of the present disclosure relates generally to communication and, more specifically, to techniques for signaling downlink control information (DCI).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects of the present disclosure provide a method for wireless communication. The method generally includes generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and transmitting the DCI to the UE.

Certain aspects of the present disclosure provide an apparatus for wireless communication. The apparatus generally includes means for generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and means for transmitting the DCI to the UE.

Certain aspects of the present disclosure provide an apparatus for wireless communication. The apparatus generally includes at least one processor configured to generate Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and transmit the DCI to the UE; and a memory coupled with the at least one processor.

Certain aspects of the present disclosure provide a computer-program product comprising a computer-readable medium having instructions stored thereon. The instructions generally executable by one or more processors for generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and transmitting the DCI to the UE.

Certain aspects of the present disclosure provide a method for wireless communication. The method generally includes receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and processing the at least one field to determine the RI and number of TBs for transmission.

Certain aspects of the present disclosure provide an apparatus for wireless communication. The apparatus generally includes means for receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and means for processing the at least one field to determine the RI and number of TBs for transmission.

Certain aspects of the present disclosure provide an apparatus for wireless communication. The apparatus generally includes at least one processor configured to receive Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and process the at least one field to determine the RI and number of TBs for transmission; and a memory coupled with the at least one processor.

Certain aspects of the present disclosure provide a computer-program product comprising a computer-readable medium having instructions stored thereon. The instructions generally executable by one or more processors for receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and processing the at least one field to determine the RI and number of TBs for transmission.

BRIEF DESCRIPTION OF THE DRAWINGS

FIG. 6 illustrates example operations that may be performed by a base station, in accordance with certain aspects of the present disclosure.

FIG. 7 illustrates example operations that may be performed by a user equipment (UE), in accordance with certain aspects of the present disclosure.

FIG. 8 illustrates an example closed-loop DCI format, in accordance with certain aspects of the present disclosure.

FIG. 9 illustrates an example open-loop DCI format, in accordance with certain aspects of the present disclosure.

DETAILED DESCRIPTION

In certain advanced protocols, spatial multiplexing may be supported, even for uplink transmissions between a user equipment (UE) and a base station. As such, there may be a need to convey various control information for the UE to use in such transactions. Certain aspects of the present disclosure provide techniques for conveying control information for uplink MIMO transmissions.

According to certain aspects, the meaning of values of various fields in the control information may differ depending on the value of one or more other fields. As a result, the control information may be conveyed using a format that is size-matched to other (e.g., previously used) formats. This may be advantageous, for example, by limiting a number of blind decodes a UE has to perform to detect a corresponding PDCCH.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
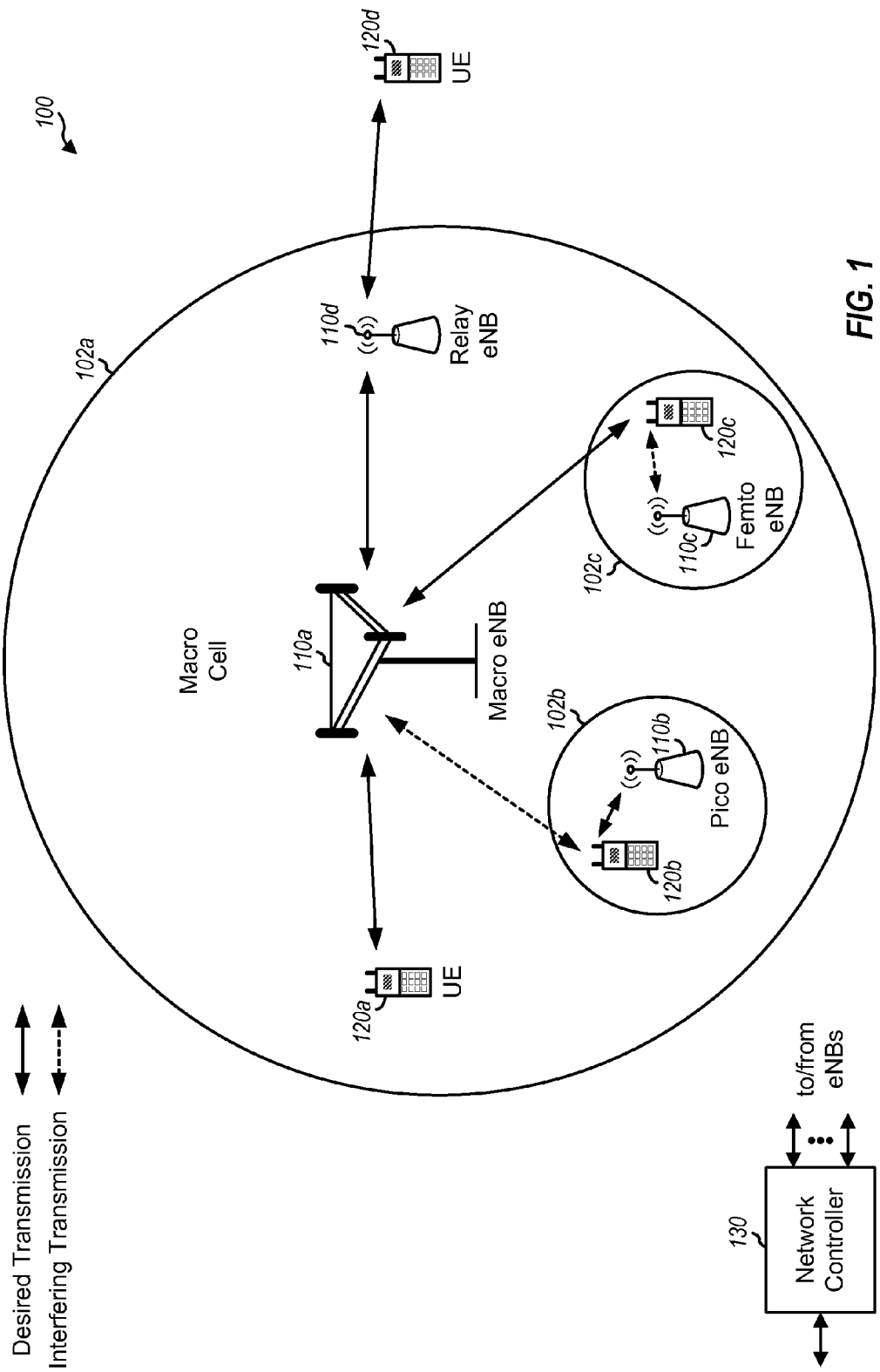
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
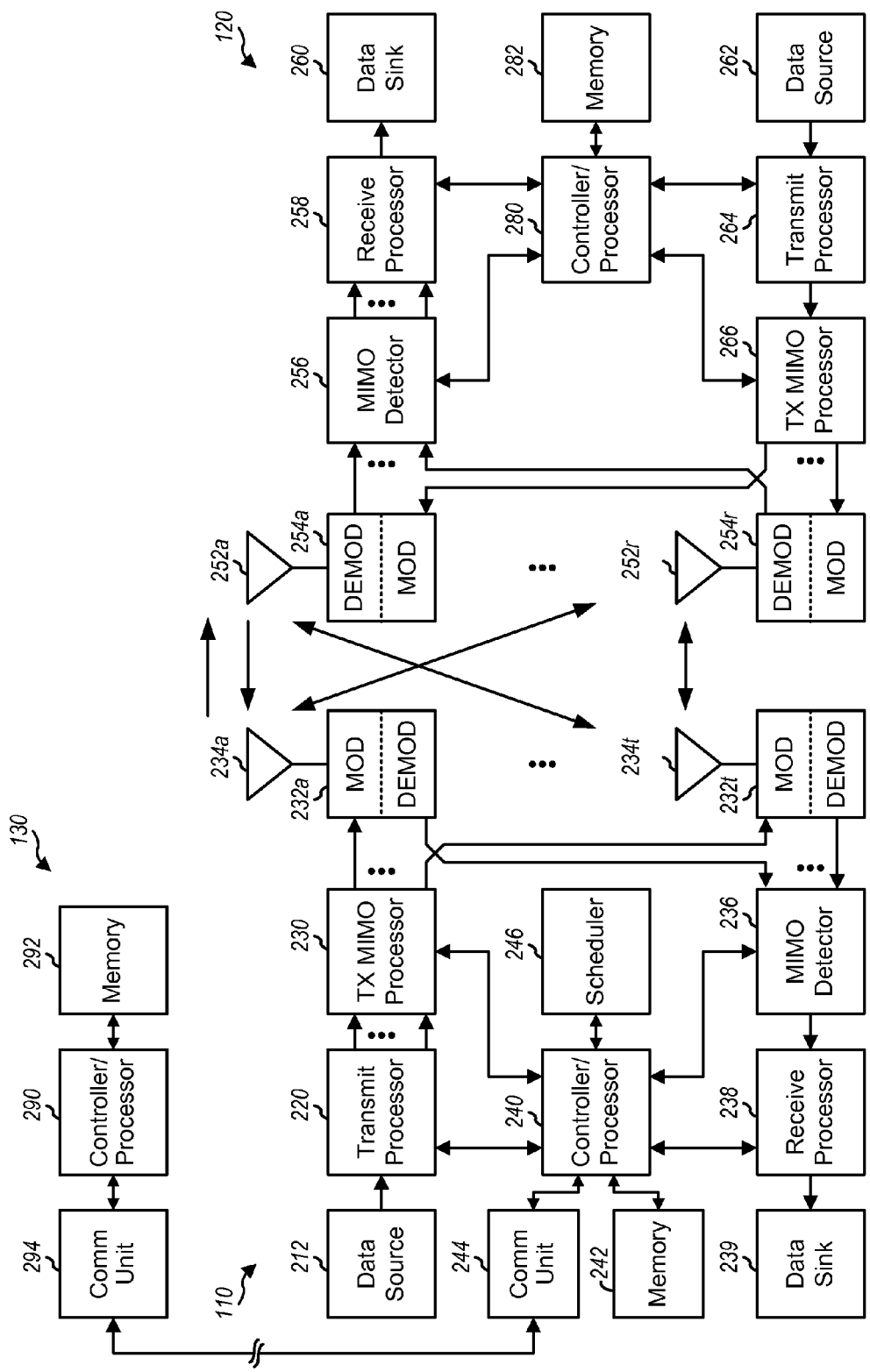
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations 600 of FIG. 6 and/or other processes for the techniques described herein. Memories 242 and 282 may store data and program codes for base station 110 and UE 120, respectively. A scheduler 244 may schedule UEs for data transmission on the downlink and/or uplink.

As will be described in further detail below, base station 110 may be configured to generating Downlink Control Information (DCI) for uplink (UL) transmissions from the UE 120. The DCI may comprise a first field that indicates both a rank indication (RI) and a number of enabled transport blocks (TBs). Thus, the UE 120 may be configured to perform complementary processing to decode the DCI, interpret the values contained therein, as described in greater detail below, and transmit an uplink transmission in accordance with the information.

Depending on the value of the first field, the values of one or more second fields may indicate different parameters. For example, if the first field has a first value that indicates there is more than one enabled TB, a second field may indicate a modulation and coding scheme (MCS) for an enabled TB. On the other hand, if the first field has a second value that indicates there is only one enabled TB, the second field may indicate precoding matrix index (PMI) and/or rank indication (RI) information. As another example, if the first field indicates there is more than one enabled TB, a third field acts as a New Data Indicator (NDI) for an enabled TB. On the other hand, if the first field indicates there is only one enabled TB, the third field may indicate which TB is enabled.

Figure 3:
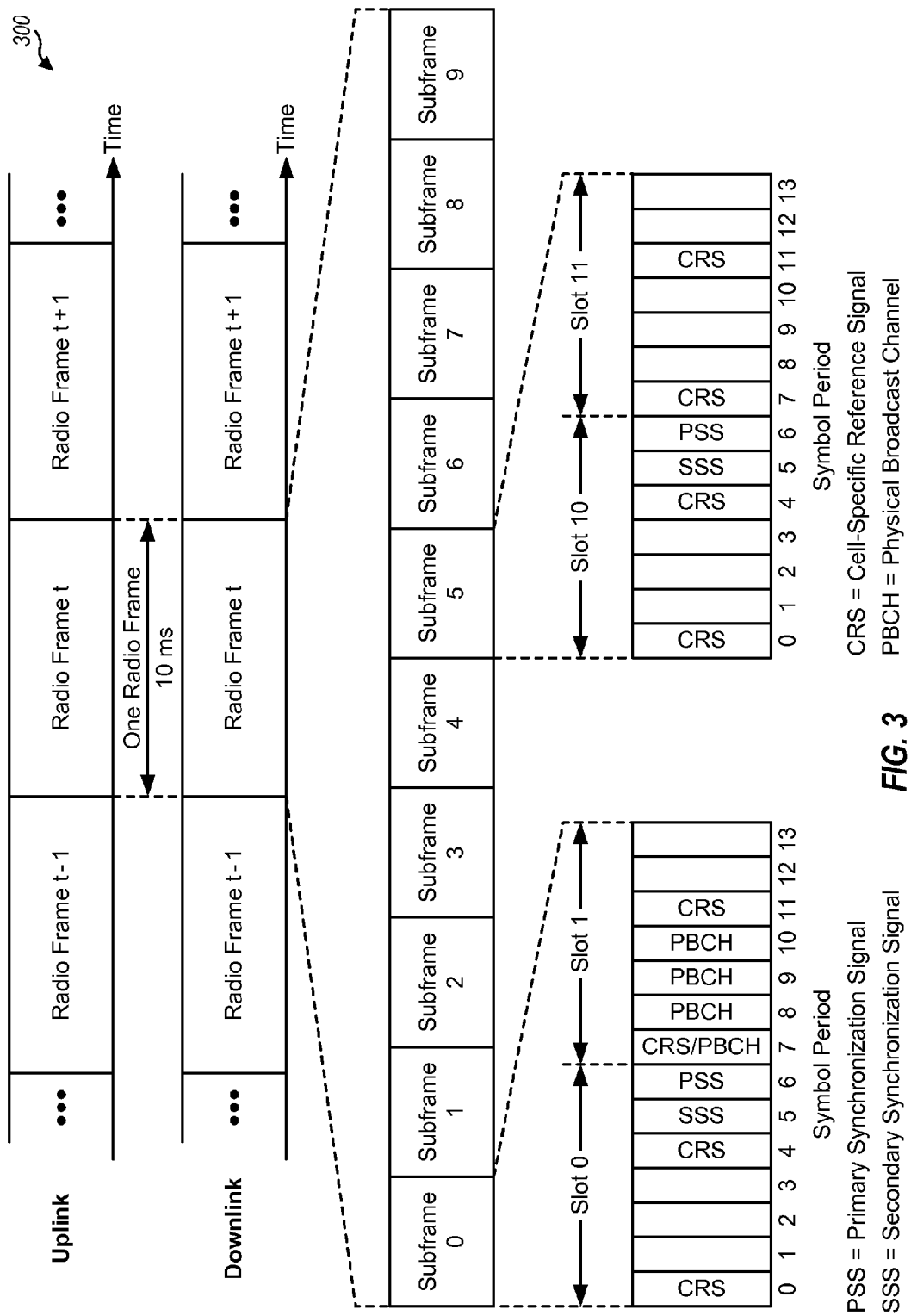
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
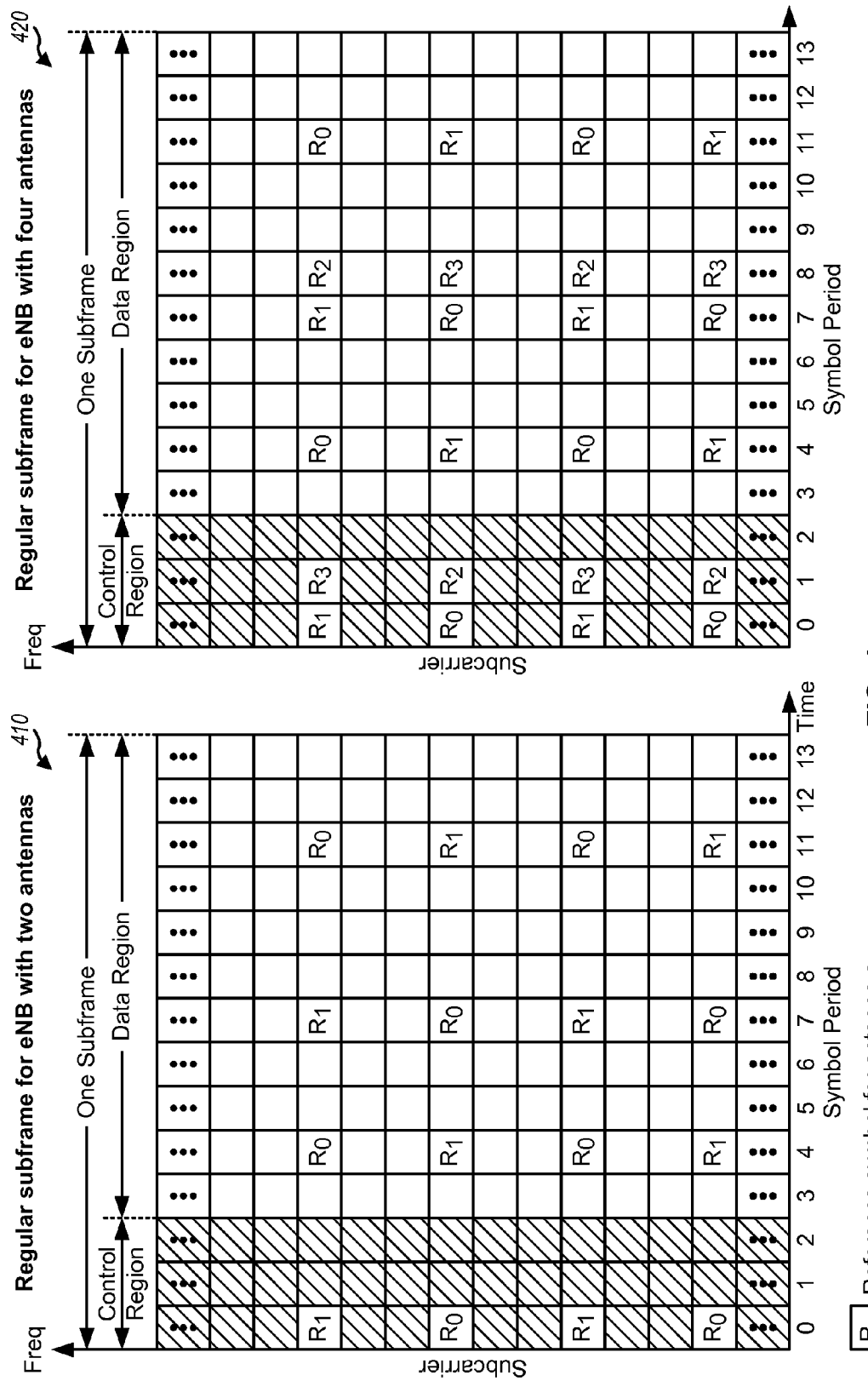
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q-1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example DCI Formats for UL MIMO Transmissions

As noted above, in certain advanced protocols, spatial multiplexing may be supported, even for uplink transmissions between a user equipment (UE) and a base station. As such, there may be a need to convey various control information for the UE to use in such transactions.

According to certain aspects, a DCI format is provided that may be beneficial in conveying information regarding closed and/or open-loop multiple input multiple output (MIMO) transmission modes for the Long Term Evolution-Advanced Uplink (LTE-Advanced UL). While the formats presented herein may share common fields with previous or existing DCI formats, certain features of the DCI formats presented herein may help efficiently convey DCI information for UL MIMO transmissions.

Conventional DCI formats, such as DCI format 0, contain various fields for scheduling single input multiple output (SIMO) uplink transmissions. These fields include, for example, a single bit flag indicating the DCI format, a hopping flag, bits for a resource block (RB) assignment and hopping resource allocation, MCS and redundancy version (RV) bits, a new data indicator (NDI) bit, transmitter power control (TPC) bits, a cyclic shift for DM RS, an uplink index (for TDD), and an aperiodic CQI request bit.

The support of uplink spatial multiplexing introduces different types of information to convey in DCI, which should be considered when designing a DCI format. As an example, DCI for MIMO uplink grants may include information indicating a number of codewords and layer mapping, HARQ and redundancy versions, MCS for each enabled TB, precoding, and DM-RS multiplexing (e.g., specifying a Cyclic shift (CS) or Orthogonal cover code (OCC).

Further, as noted above, it may be desirable to size-match DL and UL DCI formats (e.g., as done for DCI formats 0 and 1A), in order to limit the number of distinct DCI format sizes per transmission mode and, consequently, the number of blind PDCCH decodes a UE has to perform.

According to certain aspects, since dynamic rank adaptation may be supported, a DCI format may be required to support scheduling where two (or more) or only a single TB is enabled. Certain aspects of the present disclosure provide a DCI format with a single field that indicates both Rank Indication (RI) and a number of enabled transport blocks.

Figure 5:
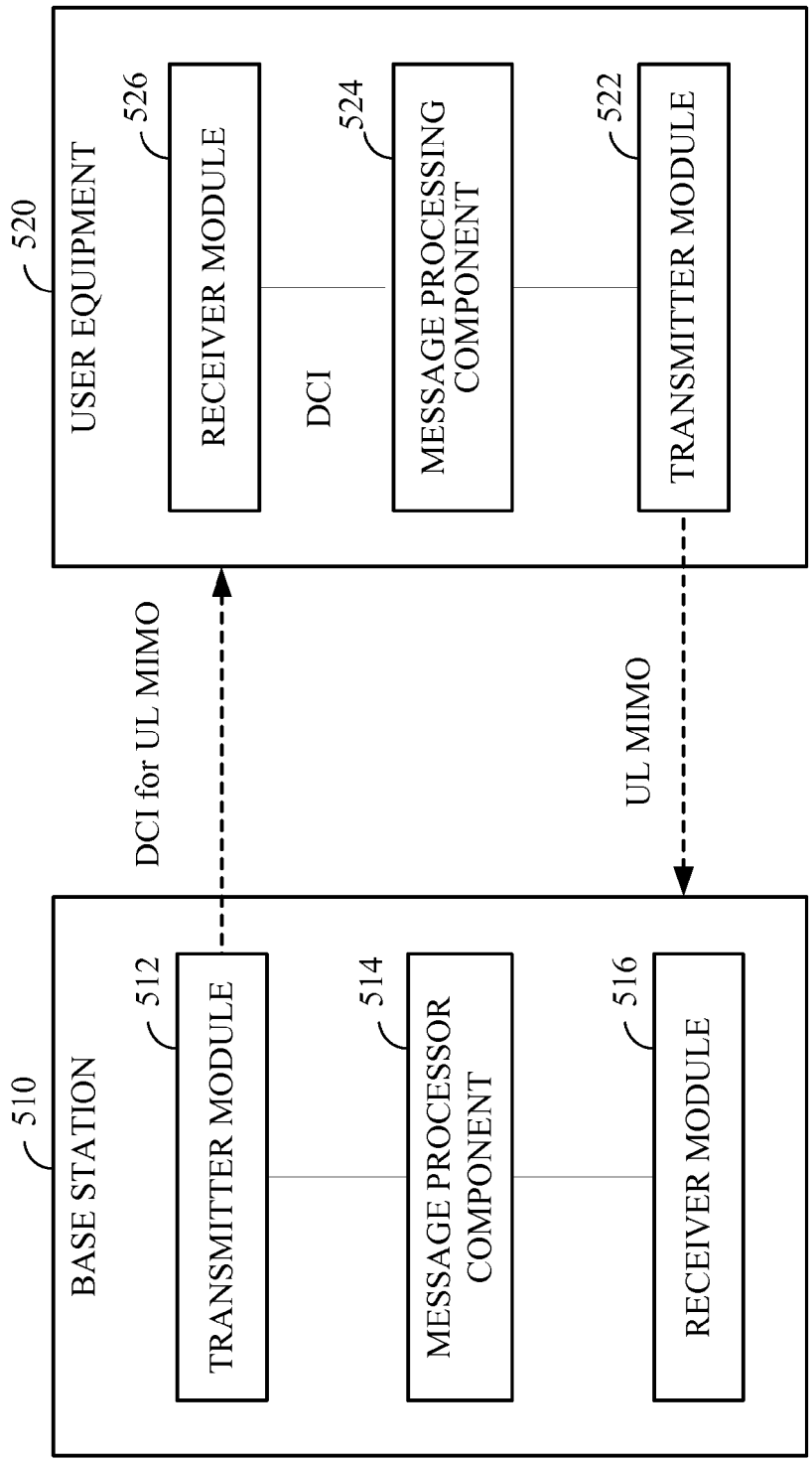
FIG. 5 shows an exemplary base station and user equipment.

FIG. 5 illustrates an example wireless system 500 with a base station (or eNodeB) 510 and UE 520 capable of utilizing DCI formats in accordance with certain aspects of the present disclosure, to schedule uplink MIMO transmissions.

According to certain aspects, a message processor component 514 of the base station 510 may generate DCI for UL MIMO transmissions and transmit the DCI to UE 520, via a transmitter module 512. A receiver module 526 of the UE 520 may decode the DCI and provide it to a message processing component 524. The message processing component 524 may utilize the information in the DCI to generate an UL-MIMO transmission sent, via a transmitter module 522, in accordance with the DCI. The base station 510 may receive the transmission, via a receiver module 516, and process it accordingly.

FIG. 6 illustrates example operations 600 that may be performed, for example, at base station 510 of FIG. 5, for generating and transmitting DCI, in accordance with certain aspects of the present disclosure.

The operations 600 begin, at 602, by generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled. At 604, the DCI is transmitted to the UE.

FIG. 7 illustrates example operations 700 that may be performed, for example, at a UE (e.g., UE 520 of FIG. 5) for receiving and processing DCI, in accordance with certain aspects of the present disclosure.

The operations 700 begin, at 702, by receiving Downlink Control Information (DCI) for uplink (UL) transmission, wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB. At 704, the at least one field is processed to determine the RI and number of TBs for transmission.

As noted above, the DCI format may include a single field that indicates both Rank Indication (RI) and a number of enabled transport blocks. According to certain aspects, the value of this field may determine what information is conveyed by one or more other fields in the DCI.

As an example, if the first field indicates there is more than one enabled TB, a second field may indicate MCS for an enabled TB. On the other hand, if the first field indicates there is only one enabled TB, the second field may indicate precoding matrix index (PMI) and/or rank indication (RI) information. As another example, if the first field indicates there is more than one enabled TB, a third field may indicate NDI for an enabled TB, while the third field may indicate which TB is enabled if the first field indicates there is only one enabled TB.

Since dynamic rank adaptation may supported, the DCI formats provided herein may support scheduling where two or only one TB is enabled. In formats according to previous standards (e.g., LTE Rel-8/9), a special combination of MCS and RV (e.g., IMCS=0 and RV=1) is defined to indicate a disabled TB in DL DCI formats 2/2A/2B, with the MCS and RV fields separately signaled. Because a single information field containing both MCS and RV may be utilized in a new UL DCI format, the same TB disabling mechanism may not be readily applied to indicate disabled TBs.

FIG. 8 illustrates an example DCI format 800 that may be used to support closed-loop MIMO UL transmissions, in accordance with aspects of the present disclosure.

As illustrated, the format 800 may include a PMI/RI field that may be used to indicate an RI value and a number enabled TBs. As will be described below, the PMI/RI field may comprise a single bit for the case of two Tx antennas or five bits for the case of four Tx antennas. The DCI may also include a second MCS field that indicates MCS for a second TB, if enabled, or PMI/RI if a single TB is enabled. The DCI may also include a second NDI field that indicates NDI for a second TB, if enabled, or indicates which TB is enabled if only a single TB is enabled.

Exactly how the various fields are used may depend on the number of transmit antennas. The following examples are for illustrative purposes only, and those skilled in the art will appreciate that different combinations of values may be used to similar effect.

In one example configuration, for a two antenna case (2 Tx), instead of a 3-bit RI/PMI, a 1-bit RI may be used. In this case, an RI value of 0 may indicate rank 1, with one TB enabled. In this case, values of MCS1 and NDI1 will be for the one enabled TB, while NDI2 indicates which TB is enabled. The 5-bit MCS2 field can then be used for other information, for example, to indicate 6 code points of rank 1 PMI and one code point for a transmit diversity 'TxDiv' scheme (accounting for 7 of the total 5-bit values), where the remaining 25 code points may be reserved.

An RI value of 1 may indicate rank 2, with both TBs enabled. In this case, MCS1 and NDI1 will be for TB1 and MCS2 and NDI2 will be for TB2.

For a four antenna case (4 Tx), a 5-bit RI/PMI may be used. As with the 2 Tx case, a value of 0 for RI/PMI may indicate rank 1 and a single TB enabled, with values of MCS1 and NDI1 for the one enabled TB, while NDI2 indicates which TB is enabled. In this case, the 5-bit MCS2 field can indicate 24 code points of PMI and one code point for a transmit diversity 'TxDiv' scheme, while the remaining code points may be reserved.

An RI/PMI value of 1 may indicate rank 2, with one enabled TB (e.g., in the event a single TB is re-transmitted). In this case, MCS1 and NDI1 will be for the enabled TB, while NDI2 indicates which TB is enabled. MCS2 may indicate 16 code points for rank 2 PMI, while the remaining 16 code points may be reserved.

A PMI value in a range from 2 to 17 may indicate rank 2, with two enabled TBs. In this case, MCS1 and NDI1 will be for TB1 and MCS2 and NDI2 will be for TB2. A PMI value from 18 to 30 may indicate ranks of 3 and 4, with two enabled TBs. In this case, MCS1 and NDI1 will be for TB1 and MCS2 and NDI2 will be for TB2. A single code point (e.g., PMI=31) may be reserved.

An open-loop transmission mode may also be utilized in some cases. Such an open-loop transmission may be used to support the various operating modes, such as UL in high Doppler environment, TDD reciprocity based precoding, and Long term precoder signaled by higher layer. For such open-loop transmission modes, an appropriate DCI format, such as the following, may be defined.

FIG. 9 illustrates an example DCI format 900 that may be used to support open-loop MIMO UL transmissions, in accordance with aspects of the present disclosure.

As illustrated, the format 900 may include a PMI/RI field that may be used to indicate an RI value and a number enabled TBs. As will be described below, the PMI/RI field may comprise two bits indicating RI and a number of enabled TBs. As with the closed-loop format of FIG. 8, the DCI may also include a second MCS field that indicates MCS for a second TB, if enabled, or PMI/RI if a single TB is enabled. Also as with the closed-loop format of FIG. 8, the DCI may also include a second NDI field that indicates NDI for a second TB, if enabled, or indicates which TB is enabled if only a single TB is enabled.

Values of these fields the 2 Tx case, may be as follows. A 1-bit RI may be used. In this case, a value of 0 for RI may indicate rank 1 and a single TB enabled, with values of MCS1 and NDI1 for the one enabled TB, while NDI2 indicates which TB is enabled. In this case, the 5-bit MCS2 field may indicate 1 code point for rank 1 open-loop, one code point for rank 1 transmit diversity, one code point if the UE is to apply reciprocity based rank 1 precoding, while 24 of the remaining code points may be reserved or used for explicit rank 1 precoding indication. It is possible to define only a subset of the code points listed. Note that if the explicit precoding indication option is included, the same DCI format may be used in both open-loop and closed mood mode and it is possible to switch between open-loop and rank-1 closed-loop operation. In the case of rank 2 operation with 2 Tx, the open-loop and closed-loop modes may be identical since there is only a single rank 2 precoding matrix defined.

For a four antenna case (4 Tx), a 2-bit RI/PMI may be used. In this case, a value of 0 for RI/PMI may indicate rank 1 and a single TB enabled, with values of MCS1 and NDI1 for the one enabled TB, while NDI2 indicates which TB is enabled. In this case, the 5-bit MCS2 field may indicate 1 code point for rank 1 open-loop, one code point for rank 2 open-loop, one code point for rank 1 transmit diversity, one code point if the UE is to apply reciprocity based rank 1 precoding, one code point if the UE is to apply reciprocity based rank 2 precoding, while 24 of the remaining code points may be reserved or used for explicit rank 1 precoding indication. It is possible to define only a subset of the code points listed. Note that if the explicit precoding indication option is included, the open-loop DCI format is able to switch between open-loop and rank-1 closed-loop operation.

An RI/PMI value of 1 may indicate rank 2, with two enabled TBs, an RI/PMI value of 2 may indicate rank 3, with two enabled TBs, while an RI/PMI value of 3 may indicate rank 4, with two enabled TBs. In each of these cases, MCS1 and NDI1 may be for the first TB, while MCS2 and NDI2 may be for the second TB.

As described above, the DCI formats presented herein may offer the capability of indicating the enabling/disabling of one of the TBs, and may achieve PDCCH overhead reduction. A DCI format such as that shown in FIG. 8 may be utilized in UL transmission modes with closed-loop UL MIMO transmissions. An additional UL transmission mode for open-loop MIMO transmission (high Doppler, reciprocity based or long term precoder based MIMO), may utilize a DCI format such as that shown in FIG. 9.

The various operations of methods described above may be performed by any suitable means capable of performing the corresponding functions. The means may include various hardware and/or software component(s) and/or module (s), including, but not limited to a circuit, an application specific integrate circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and
transmitting the DCI to the UE.

2. The method of claim 1, wherein the DCI further comprises at least a third field that:
acts as a new data indicator (NDI) field if the first field indicates more than one TB is enabled; and
indicates which TB is enabled if the first field indicates a single TB is enabled.

3. The method of claim 1, wherein the first field comprises a single bit if two transmit antennas are to be used.

4. The method of claim 3, wherein the DCI is for an uplink transmission in an open-loop mode in which the first field does not indicate a precoding matrix indicator (PMI) if two transmit antennas are to be used.

5. The method of claim 1, wherein the DCI is for an uplink transmission in a closed-loop mode.

6. The method of claim 5, wherein, if two transmit antennas are to be used, a same format is used for the DCI whether the DCI is for an open-loop or closed-loop mode.

7. The method of claim 1, wherein, if four transmit antennas are to be used, a same format is used for the DCI whether the DCI is for an open-loop or rank-1 closed-loop mode.

8. The method of claim 5, wherein the first field indicates:
a rank of one and a single TB is enabled, if the first field is a first value; and
a rank greater than one if the first field is in a range of values that does not include the first value.

9. The method of claim 8, wherein the first field indicates:
a rank of two and a single TB is enabled, if the first field is in a first subset of one or more values;
a rank of two and more than one TB is enabled, if the first field is in a second subset of one or more values; and
a rank of more than two and more than one TB is enabled, if the first field is in a third subset of one or more values.

10. A method for wireless communications, comprising:
receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and
processing the first field to determine the RI and number of TBs for transmission.

11. The method of claim 10, wherein the DCI further comprises at least a third field that:
acts as a new data indicator (NDI) field if the first field indicates more than one TB is enabled; and
indicates which TB is enabled if the first field indicates a single TB is enabled.

12. The method of claim 10, wherein the first field comprises a single bit if two transmit antennas are to be used.

13. The method of claim 12, wherein the DCI is for an uplink transmission in an open-loop mode in which the first field does not indicate a precoding matrix indicator (PMI) if two transmit antennas are to be used.

14. The method of claim 10, wherein the DCI is for an uplink transmission in a closed-loop mode.

15. The method of claim 14, wherein, if two transmit antennas are to be used, a same format is used for the DCI whether the DCI is for an open-loop or closed-loop mode.

16. The method of claim 10, wherein, if four transmit antennas are to be used, a same format is used for the DCI whether the DCI is for an open-loop or rank-1 closed-loop mode.

17. The method of claim 14, wherein the first field indicates:
a rank of one and a single TB is enabled, if the first field is a first value; and
a rank greater than one if the first field is in a range of values that does not include the first value.

18. The method of claim 17, wherein the first field indicates:
a rank of two and a single TB is enabled, if the first field is in a first subset of one or more values;
a rank of two and more than one TB is enabled, if the first field is in a second subset of one or more values; and
a rank of more than two and more than one TB is enabled, if the first field is in a third subset of one or more values.

19. An apparatus for wireless communications, comprising:
means for generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and means for transmitting the DCI to the UE.

20. The apparatus of claim 19, wherein the DCI further comprises at least a third field that:
acts as a new data indicator (NDI) field if the first field indicates more than one TB is enabled; and
indicates which TB is enabled if the first field indicates a single TB is enabled.

21. The apparatus of claim 19, wherein the first field comprises a single bit if two transmit antennas are to be used.

22. The apparatus of claim 21, wherein the DCI is for an uplink transmission in an open-loop mode in which the first field does not indicate a precoding matrix indicator (PMI) if two transmit antennas are to be used.

23. The apparatus of claim 19, wherein the DCI is for an uplink transmission in a closed-loop mode.

24. The apparatus of claim 23, wherein, if two transmit antennas are to be used, a same format is used for the DCI whether the DCI is for an open-loop or closed-loop mode.

25. The apparatus of claim 19, wherein, if four transmit antennas are to be used, a same format is used for the DCI whether the DCI is for an open-loop or rank-1 closed-loop mode.

26. The apparatus of claim 23, wherein the first field indicates:
a rank of one and a single TB is enabled, if the first field is a first value; and
a rank greater than one if the first field is in a range of values that does not include the first value.

27. The apparatus of claim 23, wherein the first field indicates:
a rank of two and a single TB is enabled, if the first field is in a first subset of one or more values;
a rank of two and more than one TB is enabled, if the first field is in a second subset of one or more values; and
a rank of more than two and more than one TB is enabled, if the first field is in a third subset of one or more values.

28. An apparatus for wireless communications, comprising:
means for receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and
means for processing the first field to determine the RI and number of TBs for transmission.

29. The apparatus of claim 28, wherein the DCI further comprises at least a third field that:
acts as a new data indicator (NDI) field if the first field indicates more than one TB is enabled; and
indicates which TB is enabled if the first field indicates a single TB is enabled.

30. The apparatus of claim 28, wherein the first field comprises a single bit if two transmit antennas are to be used.

31. The apparatus of claim 30, wherein the DCI is for an uplink transmission in an open-loop mode in which the first field does not indicate a precoding matrix indicator (PMI) if two transmit antennas are to be used.

32. The apparatus of claim 28, wherein the DCI is for an uplink transmission in a closed-loop mode.

33. The apparatus of claim 32, wherein, if two transmit antennas are to be used, a same format is used for the DCI whether the DCI is for an open-loop or closed-loop mode.

34. The apparatus of claim 28, wherein, if four transmit antennas are to be used, a same format is used for the DCI whether the DCI is for an open-loop or rank-1 closed-loop mode.

35. The apparatus of claim 32, wherein the first field indicates:
a rank of one and a single TB is enabled, if the first field is a first value; and
a rank greater than one if the first field is in a range of values that does not include the first value.

36. The apparatus of claim 35, wherein the first field indicates:
a rank of two and a single TB is enabled, if the first field is in a first subset of one or more values;
a rank of two and more than one TB is enabled, if the first field is in a second subset of one or more values; and
a rank of more than two and more than one TB is enabled, if the first field is in a third subset of one or more values.

37. An apparatus for wireless communications, comprising:
at least one processor configured to generate Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and transmit the DCI to the UE; and
a memory coupled with the at least one processor.

38. An apparatus for wireless communications, comprising:
at least one processor configured to receive Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled and process the first field to determine the RI and number of TBs for transmission; and
a memory coupled with the at least one processor.

39. A computer-program product comprising a non-transitory computer-readable medium having instructions stored thereon, the instructions executable by one or more processors for:
generating Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and transmitting the DCI to the UE.

40. A computer-program product comprising a non-transitory computer-readable medium having instructions stored thereon, the instructions executable by one or more processors for:

receiving Downlink Control Information (DCI) for uplink (UL) transmission from a user equipment (UE), wherein the DCI comprises at least a first field that indicates both a rank indication (RI) and a number of enabled transport blocks (TBs) and at least a second field that indicates either a modulation and coding scheme (MCS) for an enabled TB if the first field indicates more than one TB is enabled or information other than the MCS if the first field indicates a single TB is enabled; and processing the first field to determine the RI and number of TBs for transmission.

\* \* \* \* \*